(12) United States Patent
Metayer

(10) Patent No.: US 8,396,301 B2
(45) Date of Patent: Mar. 12, 2013

(54) SYSTEM AND METHOD FOR DOCUMENT LOCATION AND RECOGNITION

(75) Inventor: Frank Metayer, Westerly, RI (US)

(73) Assignee: GTECH Corporation, Providence, RI (US)

( * ) Notice: Subject to any disclaimer, the term of this patent is extended or adjusted under 35 U.S.C. 154(b) by 786 days.

(21) Appl. No.: 12/566,114

(22) Filed: Sep. 24, 2009

(65) Prior Publication Data

US 2011/0069893 A1    Mar. 24, 2011

(51) Int. Cl.
    *G06K 9/68*    (2006.01)
(52) U.S. Cl. ................................. 382/218; 382/224
(58) Field of Classification Search .................. None
    See application file for complete search history.

(56) References Cited

U.S. PATENT DOCUMENTS

| | | | | |
|---|---|---|---|---|
| 7,454,063 | B1 * | 11/2008 | Kneisl et al. ............... | 382/187 |
| 2001/0043742 | A1 * | 11/2001 | Melen ........................ | 382/203 |
| 2002/0037097 | A1 * | 3/2002 | Hoyos et al. ............... | 382/137 |
| 2003/0012440 | A1 * | 1/2003 | Nakanishi et al. .......... | 382/181 |
| 2007/0237401 | A1 * | 10/2007 | Coath et al. ................ | 382/232 |
| 2009/0074327 | A1 | 3/2009 | Metayer et al. | |

FOREIGN PATENT DOCUMENTS

EP        0 854 433 A2    7/1998

OTHER PUBLICATIONS

Breuel, "A Practical, Globally Optimal Algorithm for Geometric Matching Under Uncertainty," Electronic Notes in Theoretical Computer Science, 46:1-15 (2001).

International Search Report and Written Opinion for PCT/US2010/049969 mailed May 26, 2011, from the International Searching Authority of the European Patent Office.
Kim et al., "Video-Based Document Tracking: Unifying Your Physical and Electronic Desktops," UIST 2004, The 17th Annual ACM Symposium on User Interface Software and Technology, pp. 1-9, Oct. 24-27, 2004.
O'Gorman, "The Document Spectrum for Page Layout Analysis," IEEE Transactions on Pattern Analysis and Machine Intelligence, 15(11):1162-1173 (1993).
Philbin et al., "Object retrieval with large vocabularies and fast spatial matching," CVPR '07, IEEE Conference on Computer Vision and Pattern Recognition, pp. 1-8, Jun. 18-23, 2007.
Picard et al., "Geometric Consistency Checking for Local-Descriptor Based Document Retrieval," ACM DOCENG, pp. 135-138, Sep. 15-18, 2009.
Shafait et al., "Document cleanup using page frame detection," IJDAR 11:81-96 (2008).

* cited by examiner

*Primary Examiner* — Andrew W Johns
*Assistant Examiner* — Siamak Harandi
(74) *Attorney, Agent, or Firm* — McCarter & English, LLP; Kia L. Freeman, Esq.

(57) ABSTRACT

Templates of known forms are stored in computer system. The templates are digitized pixels on which connected component analyses are performed resulting in a first list of components. Five to ten of those components are selected to create an ordered feature list for each form. The computer system then captures an optical image of a form positioned on the top of a stack of forms. The optical image is digitized and stored in the computer (or processor) system as a captured digital image of pixels. A connected component analysis is performed on the captured digital image that results in a second list of image components. Image components on the second list are compared to those on the first list and then each succeeding feature in one of the ordered feature lists. If the comparison is successful, the form is known and other marks on the form may then be processed. If the comparison is unsuccessful, a new feature list is tried.

14 Claims, 5 Drawing Sheets

SYSTEM AND METHOD FOR DOCUMENT LOCATION AND RECOGNITION

RELATED APPLICATIONS

The present application is related to an application entitled CURVATURE CORRECTION AND IMAGE PROCESSING, which was filed on Nov. 26, 2008, is assigned Ser. No. 12/323,701, and is commonly owned with the present invention. This earlier application is incorporated herein by reference.

BACKGROUND OF THE INVENTION

1. Field of the Invention

The present invention is related to an optical reader employing a camera that captures an optical image of a stack of documents and converts it to a digital image. The top document typically is the document of interest, in that the top document is to be identified and the printed and man-made marks on that document are to be read, is understood and processed.

"Camera" includes any device that captures a scene on a photo-sensitive media that may in turn be scanned or read out and down loaded to a computer processing system. The captured scene is digitized into a captured digital image of pixels that are stored in a computer memory. Lenses, optical filters, apertures, etc., and the photo-sensitive media or surface, array or arrays may all be included in the term "camera."

2. Background Information

Printed documents, including, e.g., lottery play slips, scratch tickets, instant tickets and the like are collectively defined herein as "forms." Such forms may provide locations for an individual to indicate a specific intent that may be reflect, e.g., by placing a check mark or filling in a box that is printed on the form. Correctly identifying the form, and reading and processing the printed and man-made marks that are disposed on the form are not simple tasks.

In order to increase the speed of reading and processing forms, it has been suggested that a first form to be read is placed on a platen viewed by a camera, where the camera optical image is digitized and processed in a computer system. After processing the first form, another form may be simply laid on top of the first form and processed. Successive forms may then be laid one on top of another, without the need for alignment or registration, and processed.

Leaving the prior read forms in place and not having to feed each form, e.g., into a tractor drive improves efficiency by speeding the reading and processing of successive forms. One limitation, however, is that the top form may be difficult to distinguish and read due to the presence of the underneath forms, portions of which may still be visible to the camera. Moreover, one or more of the forms may be bent or crumpled, and/or the lighting may be insufficient or shadows may encroach on the form making reading is difficult.

Still other limitations in reading forms that are "stacked" or laid one on top of another typically stem from the forms being of different sizes, and including different printed symbols, words, titles, etc. When these various forms are haphazardly stacked upon one another, the camera scene includes the top form and will also include portions of many of the underneath forms.

FIGS. 1A and 1B illustrate the problem. In FIG. 1A, a stack of forms are laid one on top of each other. In this case, a series of LOTTO forms and at least one KENO form are evident. Of particular interest is that it is not evident which form is on top. One difficulty is the inability to distinguish the edges of the top form. Since forms may have printed artifacts that are not square or at right angles, the edges cannot be found simply by looking at the large printed texts. For example, as shown in FIG. 1A, the top form may be the KENO 2, the LOTTO 4, the LOTTO 6, the LOTTO 8, or the GTECH 10.

FIG. 1B illustrates the ease of distinguishing the top form when the edges of the top form are distinguished, as indicated here by the dotted line 12.

SUMMARY OF THE INVENTION

The present invention is directed toward distinguishing the top form on haphazardly piled stack of forms. Once the identity and orientation the form is determined to be on the top of a stack of forms, the image may be processed.

Herein a "feature" is defined as statically located artifact that is printed on a form. A series or group of features may be organized into a feature list that uniquely identifies the form. The feature list may include logos, form instructions, alignment or registration marks, and other printed marks. The longer the feature list, the more confident is the identification of the form. In practice, a template of pixels for all the known forms is loaded into a computer system. The pixels are processed and the pixels that exceed some threshold may be determined to indicate a mark on the form. Connected pixels may be detected as "components," and some of the components are selected to become "features" in an ordered feature list for each form.

"Components" are all the printed and man-made marks on a form and are detected is by performing a connected component analysis, or "CCA," as described below. Some "components" found from the known form templates may become the "features" that identify a form.

Illustratively, a process is executed in a computer system or a processor for distinguishing the top form atop a stack of forms. An optical image of the top of the stack of forms is captured in a camera, and the optical image is digitizing into a digital image of pixels and stored in a memory. Components, or image components, are found from the stored digital image and arranged as a list. Components from the list are compared to features sets listed for known forms that were pre-stored in the computer or processor system. If a component from the component list is matched to each of the features in the feature list, the form is known and all the other marks (printed and man-made) on the form may be detected as components on the form and processed.

A stored digital template for a known form is arranged as an ordered list of features; and the found image components are arranged into an arbitrary component list along with their locations. The image components are compared, one by one, to the list of ordered features. If the comparisons are successful, the form is known and the search area for other marks on the form is known. The outline of the form is known and relevant areas on the form are known and can be searched. Other marks in the search areas may be found and processed. If spurious other marks are found, the form may be rejected. If the comparisons are not successful, another feature list is selected for comparison to the found component list. This continues until a match is found or the feature lists are exhausted whereupon the form is rejected as unrecognizable.

The order of the feature lists to be compared may be arbitrary or it may determined by popularity of forms, ease or quickness of processing the forms or any other relevant data that may be available.

The feature list for any known form may be ordered by size, shape, or some easily determined characteristic. Illustratively, the most easily determined characteristic, often size, will head the ordered lists.

A component is selected from the component list that is a reasonable candidate for being the first feature in a feature list. A "reasonable" first component may be is determined, for example, by component size. After a successful comparison of a component to a feature, a candidate for the next feature is selected. The next component should be an appropriate distance from the first component. If no component matches the corresponding feature, the previous successful comparison is revisited and a new component is selected. If this comparison is unsuccessful, the next previous comparison is revisited and another component selected and processed. The process is reiterated as first component candidates are rejected and another first component is selected and compared to the first feature. If still unsuccessful, another feature list is selected and the process repeated. This progression continues until a successful component list matches a feature list. If that does not happen the form may be rejected and the agent notified.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
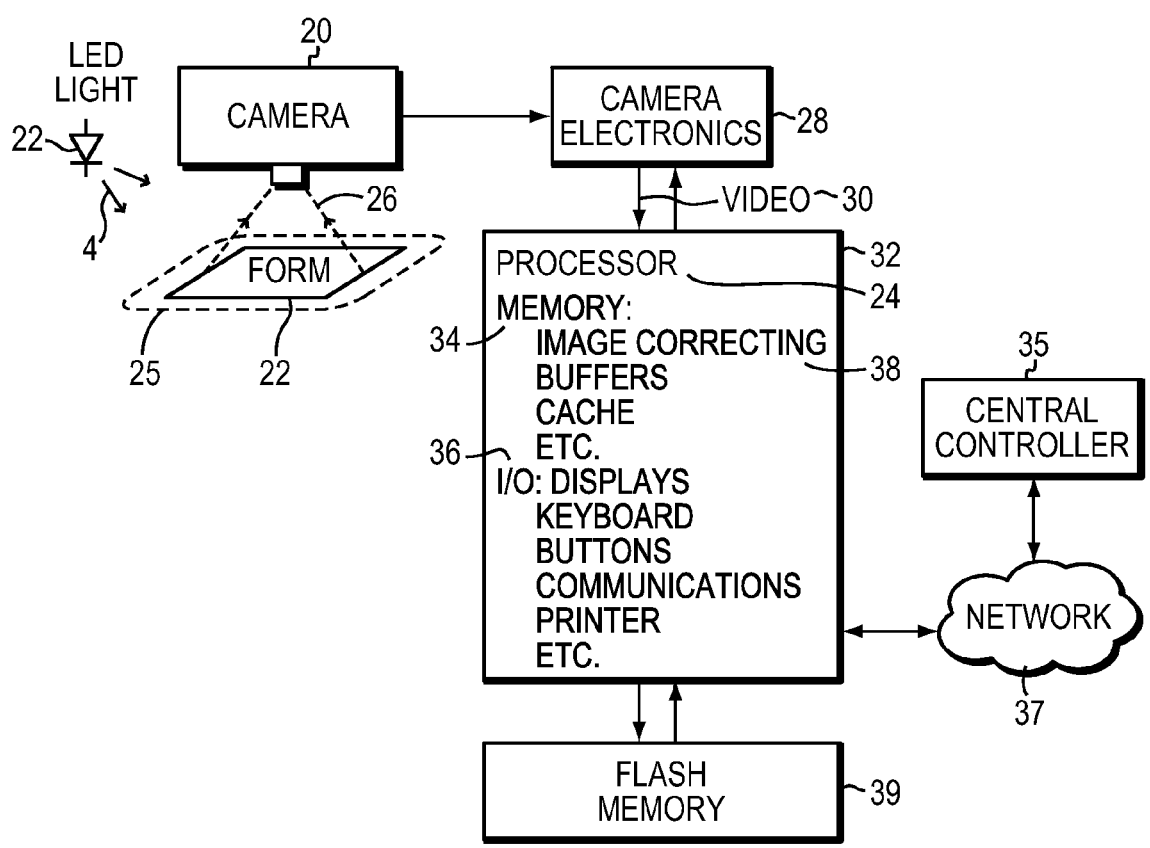
FIG. 2 is a block diagram of a camera computer system that may embody the present invention.

FIG. 2 illustrates a form 22 being illuminated by light rays 4 from a light source 22 with the reflected light 26 from the form 22 being received by a camera 20. The form 22 may represent a printed document such as, for example, a play slip, a lottery scratch ticket or a lottery instant ticket, a Keno form, etc. The form 22 may be located on a platen 25, that is positioned, e.g., a few inches to a foot or more away from the camera 20. This arrangement allows the entire form 22 to be viewed by the camera 20, although sections of the camera scene, and, thus, the form 22 may be processed in sequence. An image is impressed on the camera's photo-sensitive surface and may be downloaded (scanned or read-out) by camera electronics 28 to produce a video signal 30 that is digitized and stored as pixels or pixel data that comprise a captured digital image, and where a processor 24 in a computer processing system 32, preferably a micro-processor, operates on the pixel data. The computer processing system 32 includes memory 34 and I/O device drivers 36 for handling, at least, displays, keyboards, buttons, printers, and communications. The computer processing system 32, in turn, may be connected with a computer network 37.

Memory 34 may include at least one or more image buffers, along with other buffers, cache, etc. An operating system and software applications may be stored in the memory 34. A processing application 38, discussed below, may include processes for correcting or compensating for the curvature or distortion of a bent form. In one embodiment, an external, removable flash memory 39 may contain proprietary software, that is uploaded to the computer processor system 32. In this embodiment, removing the flash memory 39 removes the proprietary software from the computer processor system 32.

The computer network 37 may be a public network, such as the Internet, or a private network, etc., but in any case, information, such as, for example, financial information, may be encrypted to prevent outside interference and protection. In this example, information may be derived from the form and sent via the network 37 to a central controller 35. The central controller 35, inter alia, verifies the financial information and authorizes agents to act accordingly.

Although FIG. 2 illustrates a computer system, other processing systems may be used. For example, a hardware state machine implementation, a firmware implementation, additional software applications or combinations thereof may be employed. Additionally, many or even most of the operations described below may be executed at a central controller 35 via a network 37.

Figure 1A:
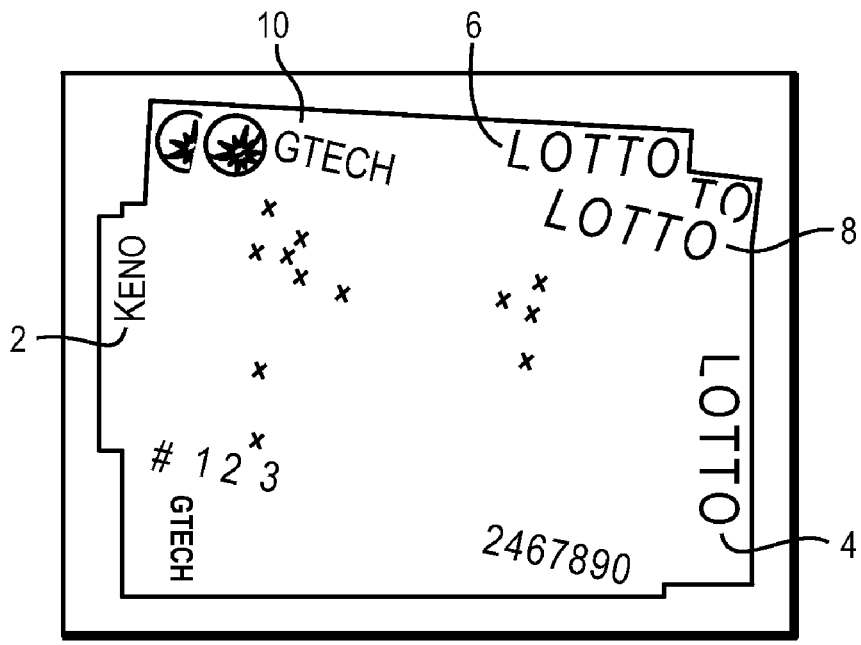
FIG. 1A is a view of a stack of forms one on top of another.
Figure 1B:
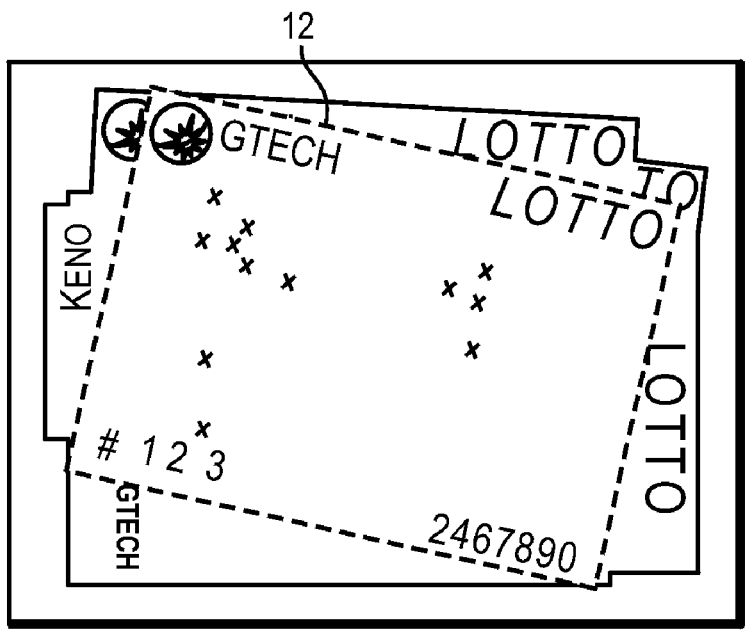
FIG. 1B shows the same stack of FIG. 1A with the top most form illustrated.

The image correction application 38 may include operations that determine the top form from the stack of forms and the type of form as in FIGS. 1A and 1B, and operations, described below, that find the printed and man-made marks on the form and then process them.

The memory 34 in the system 32 may store the captured digital image of the top of the stack of forms, but the memory 34 may also be loaded with templates of known forms. The templates are digitized pixels. A threshold may be selected where, if a pixel value (the digital value of the pixel that may be an eight bit binary number) of the captured digital image of the template exceeds the threshold, the pixel is part of a mark, part of a component. Adjacent or connected pixels (in either the captured image of the template) meeting the threshold are identified by a connected component analysis (CCA, as described herein) as a component. The connected pixels may be components and/or they may be designated as features in a feature list of a known form template. The locations of the components and features may be stored with the components. For each template, an X,Y coordinate system (or the equivalent) may be employed to identify locations on the form.

Figure 3:
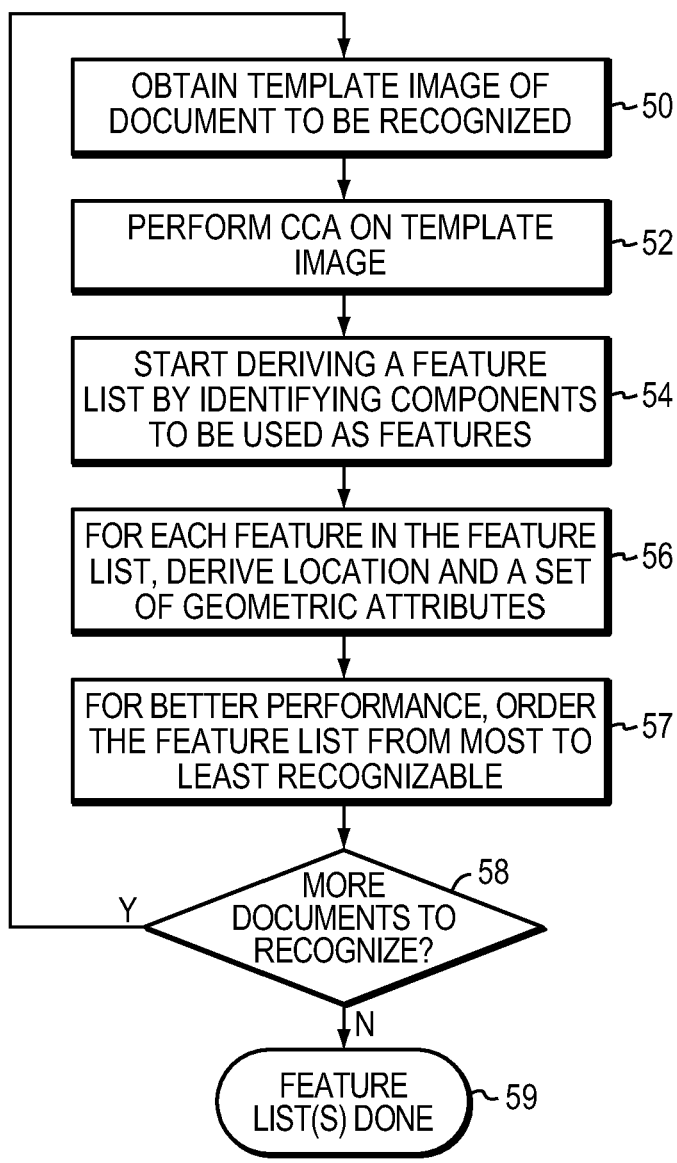
FIG. 3 is a chart illustrating operations and information for generating and storing templates or feature lists of known forms.

FIG. 3 illustrates operations to obtain and store a digital template for each of the known form types in the computer system 32. The first step of FIG. 3 is to obtain a template image of all the documents to be recognized 50, then perform a CCA (connected component analysis) 52 on the bit maps of each template image as that template is being processed, and ordered feature lists are generated as described below for all the templates. Note all the templates may be processed into ordered feature lists, but the templates may be available from a central controller and processed one at a time in other applications.

The template is an unskewed, model bitmap image of printed marks of a known form, usually of a known resolution (e.g., 200 dots/inch). The CCA is performed on the bit maps (the pixels) of the templates. Adjacent pixels are defined as connected pixels that, if they exceed a threshold, are processed as "components." All the pixels in a component are adjacent or connected to at least one other pixel in the component.

The pixels of connected components may be distinguished as black compared to white for the background of the form. Marks, however, may be reversed, with white marks on a dark background, or different colors may be used and optically distinguished. The CCA isolates and mathematically locates each component in the template image.

A list of features is then derived 54 by selecting some of the components generated for each template image. The selection may be accomplished using common sense (e.g., larger is more easily recognized than smaller, etc.), trial and error, and/or history.

For each feature in the feature list 56, location and geometric attributes are generated 56. The more features that are identified, the more confident is the resulting form identification.

Illustratively, for each feature in the list, the physical location of a feature may be the X,Y location of the center of mass (COM) of the feature. For example, a particular corner of a form or the COM of a particular component may be selected as the origin of the X,Y coordinate system. The location resolution typically will be a pixel whose size depends on the optical/digitizing parameters or characteristics of the optical/computer system as would be known to those skilled in the art. The resolution is designed to ensure that relevant marks on the form may all be recognized and processed. Illustratively, as mentioned before, 200 pixels or dots/inch may be used.

The location of a COM calculation is an averaging of the X and Y coordinates (assuming a coordinate X,Y system is in place) of the pixels of a connected component that may be performed as follows:

$COM = (\Sigma Xpixel)/mass; (\Sigma Ypixel)/mass$. Here, Xpixel is the X coordinate of a pixel, Ypixel the Y coordinates of a pixel, and another attribute, mass, is the total number of pixels in the component.

Another geometric attribute may be the radius of gyration that is calculated as follows:

$Radius = (\Sigma r^2/mass)^{1/2}$, where r is the distance from the COM to each pixel in the connected component.

Other characteristics include size, shape (e.g., round, square, crosses, etc.) and ratios such as, e.g., circumference (no. of pixels in the periphery) to size (no. of pixels in is the component or feature).

The geometric characteristics, besides the COM, may include, but are not limited to the size of the component (the number of pixels in the feature), the shape of the component (e.g., round, square, oblong, long linear, crosses, etc.), the radius of gyration of the component, and rotation and scale independent characteristics (e.g., geometric moment invariants). Other characteristics may include the dimensions of boxes or circles that may surround a separate component, or ratios such as the area/outer periphery, etc. A human may recognize many of the components as: logos, titles, form instructions, alignment marks, boxes where a human may make a mark, decorative marks, etc. The computer algorithm may also be programmed to recognize these components. Illustratively, an entire component may include a number of connected pixels.

A component may be processed, but in some applications the edge of the component may be detected and the edge, itself, may be used as another component. And the edge may be employed instead of the entire component.

From the features found, an ordered list of features may be created 57. The first feature may be a large, easily recognized feature since it has a better chance of being identified on the first scan by the characteristics alone. The second feature should also be very recognizable, and it may have the same geometric characteristics, but be in a different location. For each feature in the feature set, the location and the characteristics of the feature are recorded. Note that the distance and the direction of any two features from the feature list can be calculated from the X,Y coordinates of COM's of the features.

If more documents need to be recognized and processed 58, another template is obtained 50 and CCA is performed 52 thereon.

If no more documents need to be processed 59, all the templates have been obtained and ordered feature lists for each completed.

Illustratively, five or more specific features may be needed to identify a particular form. The five features may be the same type of mark (say a large dot) placed strategically over the surface of the form. "Strategically" means that the features surround the area on the form that must be accurately read in order to properly process the form.

Figure 4:
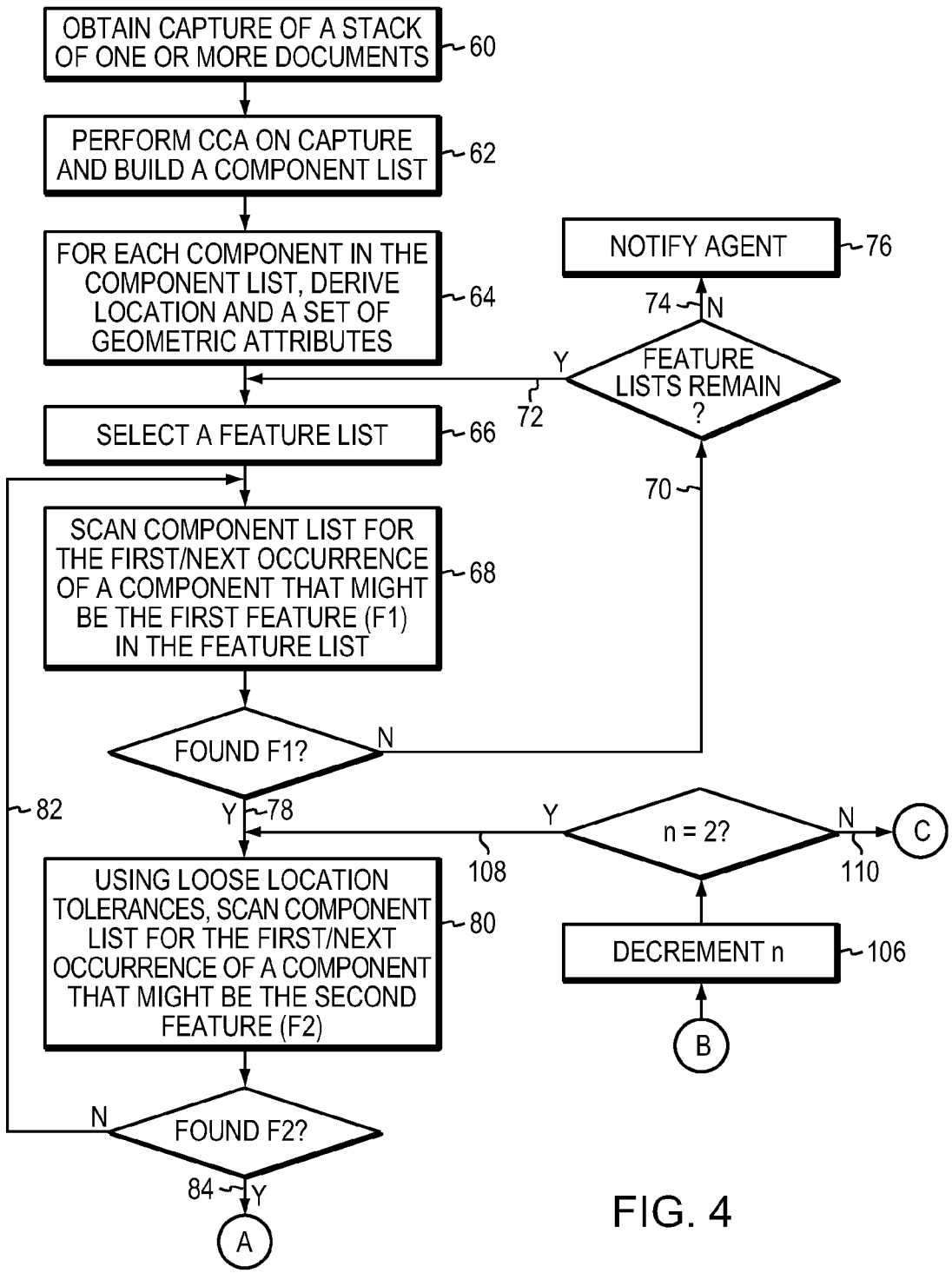
FIG. 4 is a flow chart of actions performed in a computer system to capture and image and locate and recognize a the top form on a stack of forms.
Figure 4:
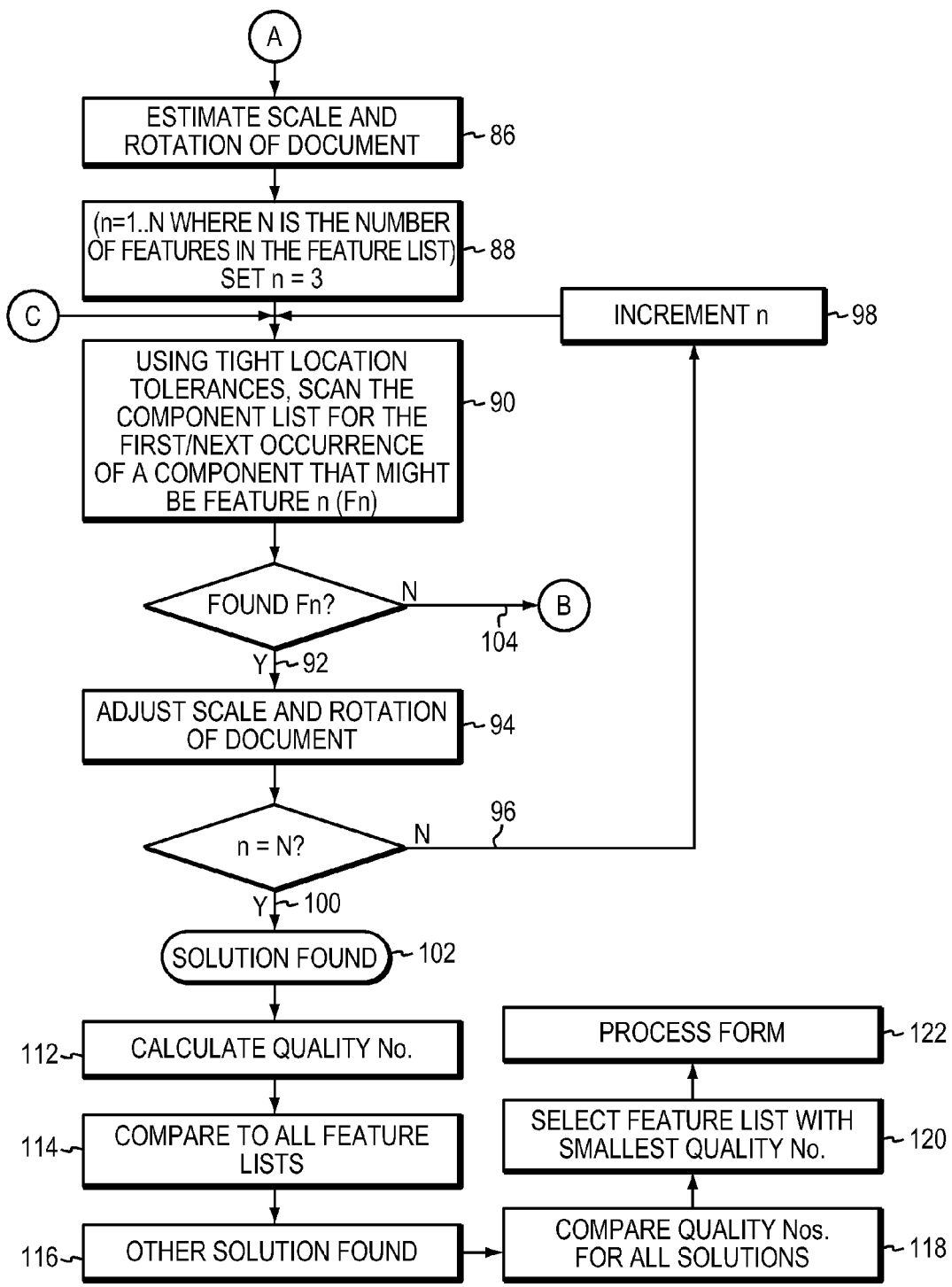

FIG. 4 illustrates a process for finding the top form on a stack of forms, where the underneath forms are partially visible. Ordered feature lists are in place for all the forms that might be processed. First capture and digitize an image of the top of the stacked forms 60, and perform a CCA operation 62 over all of the pixels of the digital image.

As mentioned above, a threshold may be established and the pixel data at or above that threshold may be determined, via the CCA process, to be part of a component. A list of components derived from the captured image may be formed 62. Note that in a captured image, there may be printed marks and/or man-made marks, in addition to spurious marks inadvertently made. All of these marks, if the pixel data is above the aforementioned threshold, may be determined to be components.

For each component in the component list the location is found and a set of geometric attributes is derived 64. The location may be in an X,Y coordinate system as described above, where the relative locations of the components are of interest.

Next step is to select one of the stored feature lists 66. This selection may be determined from the popularity of forms, or ease of processing, or some other characteristic that would recommend a form type.

The present application assumes that the forms are flat enough and placed under the camera with lighting, shadows, reflected light intensity over the surface of the top of the stack of forms and the intensity thresholds of the digitizer of the photo-sensitive surfaces are all sufficient to process the digitized scene. Note that the orientation of the top most form may be at any angle over the full 360 degrees.

The component list is scanned for a component that might be the first feature in the selected feature list 68. If none are found 70, and there are feature lists remaining 72 another feature list is selected 66. If no feature lists remain 74, the operation determines that the top form cannot be recognized and notifies an agent 76.

If a match of a component to the first feature in the selected feature list is found 78, the component list is scanned for the second or next component that might be the is second feature in the selected feature list 80. The distance of second component from the first component may be compared to the distance of the second feature to the first feature. A loose tolerance of +/−30% may be applied to the distances calculated. In practical applications the second feature might be near the distal edge of the form and not within the loose tolerance. If so the second feature is not matched 82, the operations revert back to item 68 where the component list is scanned for the next component candidate to be compared with the first feature in the feature list.

If the second feature is matched 84, the scale and orientation or rotation of the form is estimated 86. For example, if the distance between the two features from the feature list is 500 pixels, but the distance between the two components that match the first two features is 400 pixels a distance correction factor of 0.8 is used for future distance calculations. The orientation of the two matched features from the feature list and the matched components can be derived from the X,Y coordinates for the first two features, and the orientation is accepted.

At the first pass, two features have been matched, and the number of features in the feature list is known, say N. Let F(n) be the next feature being matched 88.

At step 90, using the latest scale factor tolerances, the component list is scanned for next component that might match F(n). If F(n) is found 92, the scale and rotation is adjusted tighter 94.

Figure 5:
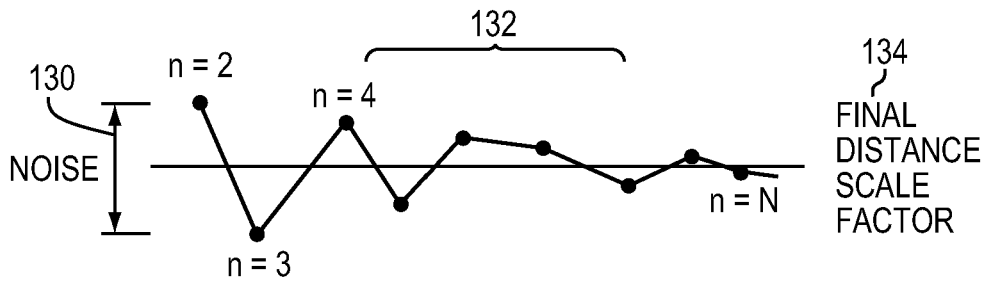
FIG. 5 is a graph of scale factors versus number of features.

For example, if the distance scale factor determined from matching the first two might be less than or more than one, but, in practical examples, the scale factor will tend converge on a single number as the number of features are investigated. The distance scale factor is calculated for each new feature to each of the found features until each and every feature in the feature list is matched. FIG. 5 illustrates the progression as n=N. the highest peak-to-peak excursions is labeled noise 130, and the convergence for each n is shown 132 until at n=N a final distance scale factor is determined 134.

For orientation, a similar operation to the distance scale factor is used. The initial orientation of the second feature to the first is used to initially determine orientation But the orientation between the second and the third, or the first and the third is tightly enforced. For example, if the first to the second (being 400 pixels apart) was at 90° is rotation and the second to the third (being 600 pixels apart) was at 88°, then [400(90°)+660(88°)]/(400+660) might be the orientation applied to the orientation of the next feature compared. That is, the next feature must be oriented to the other features within the limits of this orientation. The orientation might be calculated for a few of the features, but it may be calculated for all the features in the feature list.

If n does not equal N, step 96, n is incremented 98 and the components are scanned until the next feature is matched. During this matching the tighter tolerances are calculated and recursively used as each feature is processed. If n does equal N, step 100, then a solution has been found 102 and the feature list selected is directly associated with a particular form type. The components in the captured image are then known. The locations and meanings of all the marks, including printed and man-made, are known so that the form is read and processed by the computer system.

After step 90, if F(n) is not found 104, n is decremented 106 and, if n=2, step 108, then step 80 is taken. If n does not equal 2, step 110, then step 90 is taken. And successive revisits to earlier comparisons are made and if unsuccessful after all the components have been tried, the other feature lists are tried and if still unsuccessful, the agent is notified and corrective action taken.

Once a solution has been found, a quality number is generated 112 from the scale factors that are re-calculated after each feature is matched. The quality number is the maximum peak to peak excursion of the distance scale factor (noise 130 of FIG. 5) divided by the final scale factor.

After a solution is found, all the other feature lists are investigated 114 to see if other matches may exist. If other matches are found 116, the quality factor for each feature list solution is compared 118 and the feature list with the smallest quality number 120 is selected as the correct form and the remaining components on the form, including man-made components, are then processed 122.

In practice, when the last components are matched to features in the feature list, the distance scale factor might have a tolerance of +/−2% or so. That is the distance factor might be 0.8+/−2%. The same precision might be applied to the orientation scale is factor.

Note that, since the mass of an object is the number of pixels constituting that component, a scale factor for mass may be calculated in a similar fashion as that for distance. Again, the tolerance would diminish as the mass of more features are processed.

Briefly, some variation may be found in some applications. The above operation compares a captured digital image of the form to stored digital templates of known forms. Components are found in both the captured digital image and the stored digital template. The components found in the stored template are arranged into a feature list, and if components detected in the captured image match a feature list for a known form, the form type is determined. The outline of the known form may be generated to limit the search area for additional marks. While processing all these additional marks on the known form, if a spurious mark is encountered, for example, a mark that extends into areas on the form that should have no marks or outside the outline of the form, the form may be rejected and the local agent notified If no spurious marks are found, the form is processed by inspecting all the relative locations on the form for printed and other man-made marks that may be interpreted for meaning. The interpretation may be made locally or by a central controller. For example, pencil marks may be processed to determine that a particular numbers has been selected, and a printed form may be generated therefrom. Later, any prospective winning form may be sent to a central controller where verification may be performed. The central controller may then authorize payment.

An alternative approach may be to compare a first component C1 candidate to the first feature F1 in each feature set, then, a second component is compared to the second feature in each of the feature lists with matched first features. This process continues until only one component set matches each feature in a feature list. If more than one feature list is matched, the feature list with the minimum scale factor noise may be selected.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A process executed in a computer or processor for distinguishing a form lying atop a stack of forms, the process comprising the steps of:

capturing an optical image of the top of the stack of forms;
    digitizing the optical image into a digital image of pixels and storing the pixels in a memory;
    detecting image components from the stored pixels;
    generating a location and attributes for each component found;
    comparing the detected image components to features of known forms, wherein the step of comparing compares the location, attributes and orientation of each candidate component to a feature;
    if the comparing is successful, the form is known; and
    processing all the other components on the form,
    wherein the comparing of locations of a subsequent candidate component to the next feature from the feature list includes a first measuring the distance between at least one prior successful candidate and the subsequent candidate component and a second measuring the distance between the corresponding feature, wherein a correction scale factor for distance is calculated from the ratio of the first to the second measurements, wherein the distance scale factor is applied when comparing the next candidate component to the next feature, and further re-calculating the distance scale factor as each new candidate component is compared to the next feature.

2. The process of claim 1 wherein the step of detecting image components from the stored pixels comprises the steps of:
   setting a threshold wherein a pixel in the stored image exceeds the threshold, the pixel is part of a component; and
   finding adjacent pixels that exceed the threshold, wherein the adjacent connected pixels are part of the component.

3. The process of claim 1 wherein the step of comparing the detected image components comprises the steps of:
   storing templates of pixels of known forms;
   finding template components from the stored template pixels;
   selecting features from the found template components;
   arranging the selected features into an ordered feature list;
   comparing an image component to the first feature, then a second image component to the second feature, and continue until all the features in the ordered feature list have been successfully compared to corresponding image components.

4. The process of claim 1 further comprising the step of:
   generating a noise factor for each known form from the peak to peak variations of the distance scale factor.

5. A process executed in a computer or processor for distinguishing a form lying atop a stack of forms, the process comprising the steps of:
   capturing an optical image of the top of the stack of forms;
   digitizing the optical image into a digital image of pixels and storing the pixels in a memory;
   detecting image components from the stored pixels;
   generating a location and attributes for each component found;
   comparing the detected image components to features of known forms, wherein the step of comparing compares the location, attributes and orientation of each candidate component to a feature;
   if the comparing is successful, the form is known; and processing all the other components on the form,
   wherein the comparing of orientation of a subsequent candidate component to the next feature from the feature list includes measuring the orientation between at least one prior successful candidate and the subsequent candidate component and a second measuring the orientation between the corresponding feature, wherein a correction scale factor for orientation is calculated from:

[D1(angle1)+D2(angle2)]/(D1+D2), where D1 is the distance from a first to a second component, D2 is the distance from the second to a third component, and angle 1 is the angle orientation from the first to the second components, and angle 2 is the angle from the second to the third components, wherein the orientation is applied when comparing the next candidate component to the next feature, and further re-calculating the orientation as each new candidate component is compared to the next feature.

6. The process of claim 1 wherein the step of comparing the detected image components includes the step of: applying an X,Y coordinate system to the captured digitized image, wherein component's location is the X,Y coordinates of its COM.

7. The process of claim 1 further comprising the steps of:
   if a match is not found between an image component and a feature, discarding the previous image component that matched the previous feature and selecting another image component and comparing it to the previous feature;
   if a match is not found, discarding the next previous image component;
   selecting another image component;
   comparing the next selected image component to the next previous feature, and, if a match is still not found, continue reiterating previous image component to feature comparisons until the first image component is discarded and another component is compared to the first feature, and if a match is not found, selecting a different known form and comparing the image components to the different known form features.

8. The process of claim 7 wherein, if the image components set match an ordered feature set, the form is known and the other marks on the known form are processed, if a match is still not found and all the feature lists have been compared, the form is rejected and an agent is notified.

9. The process of claim 4 wherein the step of comparing captured components to features of known forms includes the steps of, when the captured components successfully are compared to more than one known form, and selecting the known form from the known form having the smallest noise factor.

10. A computer or processor apparatus for distinguishing a form lying atop a stack of forms, the apparatus comprising:
   a camera system that captures an optical image of the top of the stack of forms;
   a digitizer that converts the optical image into a digital image of pixels:
   a memory for storing the digital image of pixels;
   image components derived from the digital image of pixels;
   a comparator for comparing the found image components to features of known forms, wherein, if the comparing is successful, the form is known, and all the other image components on the form may be processed;
   templates of known forms, the templates comprising pixels;
   components detected from the template pixels;
   an ordered list of features selected from the detected template components; wherein comparing an image component to the first feature, then a second image component to the second feature, and continuing until all the features in the ordered feature list have been successfully compared to corresponding image components, whereupon a known form is determined to be the top form of the captured image;
   an application that generates location and attributes for each component found, wherein the attributes include center of mass, mass and radius of gyration, and wherein the center of mass defines a location of the component and wherein relative locations of each component may be used to generate the distance between locations and an orientation of each component to any other component; and
   a distance scale factor calculated from dividing the distance measured between two image components, that have been successfully compared to particular features, by the distance measured between the corresponding particular features, and an orientation scale factor calculated from the relative orientation of the image components compared to the relative orientation of the corresponding particular features.

11. The apparatus of claim 10 further comprising: a threshold wherein when a pixel in the stored image exceeds the threshold, the pixel is part of an image component, and when adjacent pixels exceed the threshold the adjacent pixels are part of an image component.

12. The apparatus of claim 10 further comprising: an X,Y coordinate system that is applied to the image component and the feature components.

13. A process executed in a computer or processor for distinguishing a form lying atop a stack of forms, the process comprising the steps of:
   capturing an optical image of the top of the stack of forms;
   digitizing the optical image into a digital image of pixels and storing the pixels in a memory;
   detecting image components from the stored pixels;
   generating a location and attributes for each component found;
   comparing the detected image components to features of a plurality of known forms, wherein the step of comparing compares the location, attributes and orientation of each candidate component to a next feature from a feature list;
   identifying the form as one of the plurality of known forms if the comparing is successful; and
   processing all the other components on the identified form, wherein the comparing of locations of a subsequent candidate component to the next feature from the feature list includes a first measuring the distance between at least one prior successful candidate and the subsequent candidate component and a second measuring the distance between the corresponding feature, wherein a correction scale factor for distance is calculated from the ratio of the first to the second measurements, wherein the distance scale factor is applied when comparing the next candidate component to the next feature, and further re-calculating the distance scale factor as each new candidate component is compared to the next feature.

14. The process of claim 13 wherein the attributes include center of mass, mass and radius of gyration, and wherein the center of mass defines a location and wherein relative locations of each component may be used to generate an orientation of each component to any other component.

* * * * *